(12) United States Patent
Horinouchi et al.

(10) Patent No.: US 11,644,357 B2
(45) Date of Patent: May 9, 2023

(54) FLOW RATE DIAGNOSIS APPARATUS, FLOW RATE DIAGNOSIS METHOD, AND STORAGE MEDIUM STORING THEREON PROGRAM FOR FLOW RATE DIAGNOSIS APPARATUS

(71) Applicant: HORIBA STEC, Co., Ltd., Kyoto (JP)

(72) Inventors: Osamu Horinouchi, Kyoto (JP); Koji Imamura, Kyoto (JP); Masaki Kobayashi, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 71 days.

(21) Appl. No.: 17/195,999

(22) Filed: Mar. 9, 2021

(65) Prior Publication Data

US 2021/0285808 A1 Sep. 16, 2021

(30) Foreign Application Priority Data

Mar. 11, 2020 (JP) .............................. JP2020-042456

(51) Int. Cl.
*G01F 25/10* (2022.01)
(52) U.S. Cl.
CPC .................................. *G01F 25/10* (2022.01)
(58) Field of Classification Search
CPC ................................ G01F 25/10; G01F 25/15
See application file for complete search history.

(56) References Cited

U.S. PATENT DOCUMENTS

2009/0112491 A1* 4/2009 Nakada ............... G01F 25/15
702/183
2014/0083159 A1* 3/2014 Nagai ................... G05D 7/00
73/1.34

FOREIGN PATENT DOCUMENTS

JP 11087318 A * 3/1999
JP 11087318 A 3/1999

\* cited by examiner

*Primary Examiner* — Natalie Huls
*Assistant Examiner* — Sharad Timilsina
(74) *Attorney, Agent, or Firm* — Alleman Hall Creasman & Tuttle LLP

(57) ABSTRACT

A flow rate diagnosis apparatus includes: a main line in which a tank having a volume is provided; a branch line that branches from the main line on an upstream side of the tank; a first open close valve provided in the branch line; a second open close valve provided in the main line; a dead volume defined from the diagnosis object as an upstream end and the first open close valve and the second open close valve as downstream ends; and a second pressure control mechanism that controls a fluid flowing through the main line such that the pressure of the fluid in the dead volume is maintained at a second setting pressure during an inflow mode during which the fluid is caused to flow into the tank by closing of the first open close valve and opening of the second open close valve after a preparation mode.

15 Claims, 14 Drawing Sheets

CASE IN WHICH SECOND PRESSURE CONTROL MECHANISM
PERFORMS PRESSURE CONTROL WHEN FLOW RATE TO BE
CORRECTED IS GREATER THAN OR EQUAL TO PREDETERMINED VALUE

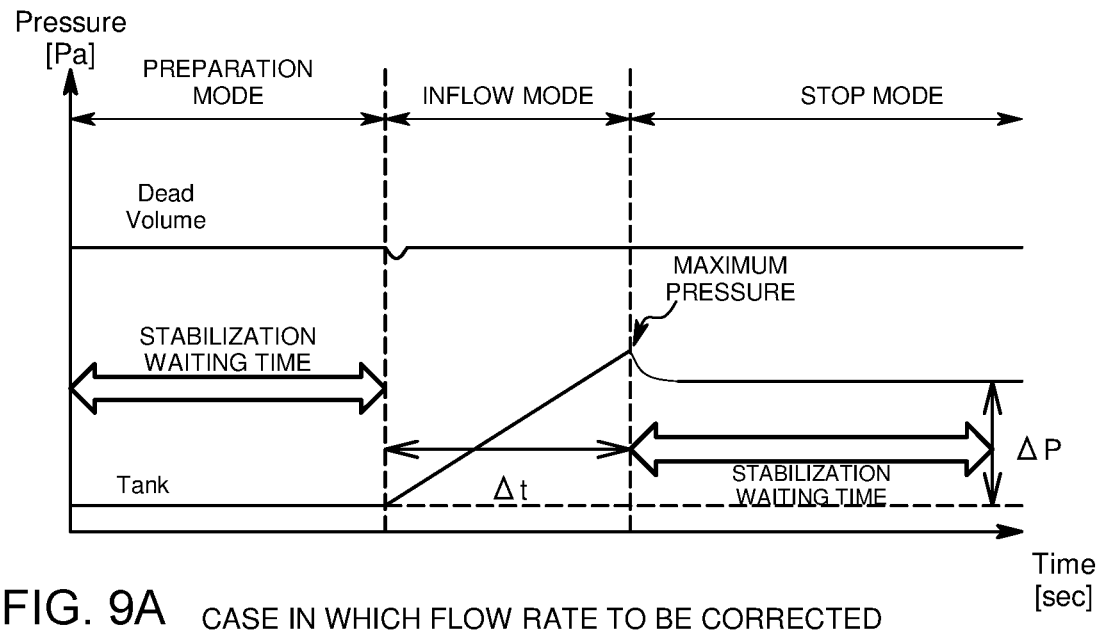
FIG. 9A  CASE IN WHICH FLOW RATE TO BE CORRECTED IS LESS THAN PREDETERMINED VALUE
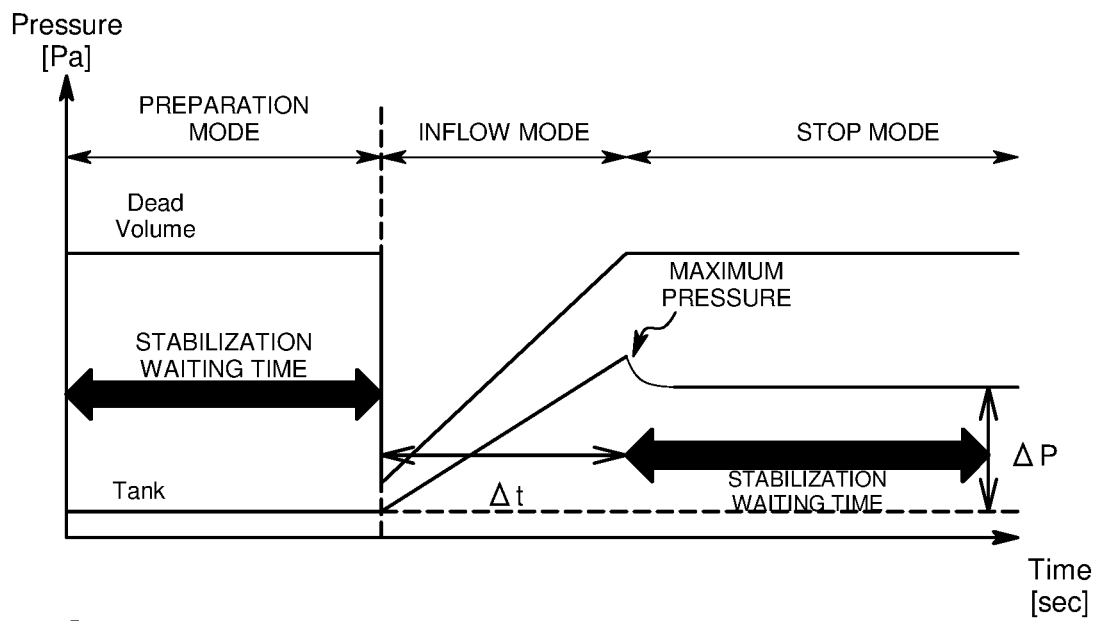
FIG. 9B  CASE IN WHICH FLOW RATE TO BE CORRECTED IS GREATER THAN OR EQUAL TO PREDETERMINED VALUE ized, as illustrated in FIG. 13B, the open/close state of
FLOW RATE DIAGNOSIS APPARATUS, FLOW RATE DIAGNOSIS METHOD, AND STORAGE MEDIUM STORING THEREON PROGRAM FOR FLOW RATE DIAGNOSIS APPARATUS

TECHNICAL FIELD

The present invention relates to a flow rate diagnosis apparatus used for diagnosing a flow rate measured by a flow rate sensor or a flow rate controlled by a flow rate control apparatus.

BACKGROUND ART

A semiconductor manufacturing process or the like employs a mass flow controller, which is a flow rate control apparatus in which a flow rate sensor, a control valve, and a flow rate controller are packaged for controlling the flow rate of a fluid.

A mass flow controller may become incapable of controlling the flow rate of a fluid in accordance with a setting flow rate as a result of, for example, long-term deterioration caused by clogging of a flow line. Thus, mass flow controllers need to be inspected on a regular basis to determine whether they remain capable of controlling the flow rate in accordance with the setting flow rate.

Accordingly, some fluid supply systems of the related art include a configuration for diagnosing the flow rate in a mass flow controller or the like. For example, Japanese Unexamined Patent Application Publication No. 11-87318 discloses a flow rate diagnosis apparatus that diagnoses the flow rate in a mass flow controller by a dynamic constant volume method (pressure rate of rise (ROR) method).

As a static method, a flow rate diagnosis method called the pressure volume temperature time (PVTt) method enables diagnosis at higher accuracy than the dynamic constant volume method and is employed by the National Institute of Standards and Technology (NIST). A flow rate diagnosis apparatus used for performing the PVTt method is illustrated in FIGS. 13A and 13B.

That is, a flow rate diagnosis apparatus 100 includes a main line ML and a branch line SL. The main line ML connects a mass flow controller, which is a diagnosis object DO, and a tank TN having a predetermined volume. The branch line SL branches from the main line ML between the diagnosis object DO and the tank TN. To downstream ends of the main line ML and the branch line SL, vacuum pumps SP, which are vacuum sources, are connected. In addition, in the main line ML and the branch line SL, a plurality of valves V1, V2, and V3 are provided. Furthermore, an auto pressure controller (APC), which is a first pressure control mechanism 1, is provided in the branch line SL. When a fluid flows through the branch line SL, the APC provided in the branch line SL maintains the pressure in a dead volume DV constant. The dead volume DV is a space from the diagnosis object DO to the valves V1 and V2.

The PVTt method proceeds as follows. First, for example, the pressure in the tank TN is substantially made a vacuum, and then, as illustrated in FIG. 13A, a preparation mode for causing the fluid to flow through the branch line SL and not causing the fluid to flow into the tank TN is implemented. As illustrated in the graph indicating a temporal change of the pressure in FIG. 14, the preparation mode is continued until the pressure in the dead volume DV is stabilized within a predetermined allowable range.

After the pressure in the dead volume DV has been stabilized, as illustrated in FIG. 13B, the open/close state of the valves V1 and V2 is switched, and an inflow mode for causing the fluid to flow into the tank TN is implemented. Since the pressure in the tank TN is close to a vacuum immediately after the start of the inflow mode, the fluid suddenly flows into the tank TN. Thus, as illustrated in the graph in FIG. 14, the pressure in the dead volume DV is suddenly reduced to a value close to the pressure in the tank TN. The inflow mode is continued until the pressure and temperature in the dead volume DV return to an initial pressure and an initial temperature at the start of the inflow mode and then ends by closing of the valve V2 before the tank TN in the main line ML. An elapsed time $\Delta t$ from the start of the inflow mode until the end thereof is measured for calculating the reference flow rate.

Lastly, as illustrated in FIG. 14, a stop mode for waiting for a predetermined period from stopping of the flow of the fluid into the tank TN until stabilization of the pressure in the tank TN is implemented. A differential pressure $\Delta P$ between the pressure in the tank TN that is stabilized in the end and the initial pressure at the start of the inflow mode is measured.

On the basis of the elapsed time $\Delta t$ and the differential pressure $\Delta P$ that are measured and a gas state equation, the reference flow rate is calculated. By comparing the reference flow rate with a flow rate measured in the mass flow controller, the flow rate in the mass flow controller is diagnosed.

The reference flow rate calculated by the PVTt method through the above procedure is unlikely to be influenced by pressure fluctuation, temperature fluctuation, or the like compared with the ROR method. Thus, the calculation accuracy and the diagnosis reliability can be increased.

However, in the PVTt method of the related art, as illustrated in the graph in FIG. 14, the inflow mode needs to be continued for a long time until the pressure in the dead volume DV returns to the original state from a greatly decreased state for the following reason. The pressure in the tank TN needs to be increased slowly so that the pressure or temperature in the dead volume DV can return to the state in the preparation mode. Thus, the time for the full diagnosis procedure becomes much longer than that for the ROR method.

Furthermore, the fluid needs to flow into the tank TN continuously until the pressure in the dead volume DV returns to the original state, and thus, the volume of the tank TN needs to be comparatively large. As a result, the amount of the fluid that is necessary to perform the PVTt method is also larger than that for the ROR method. Furthermore, since the volume of the tank TN has an upper limit for the restrictions of footprints of equipment or the like, it is difficult to perform a diagnosis with a high flow rate in the mass flow controller.

CITATION LIST

Patent Literatures

Patent Literature 1: Japanese Unexamined Patent Application Publication No. H11-87318

SUMMARY OF INVENTION

Technical Problem

The present invention has been made in view of the above issue and is directed at providing a flow rate diagnosis apparatus that can shorten the time necessary for flow rate diagnosis compared with the related art, despite using the PVTt method, and that enables downsizing of a tank and diagnosis with a high flow rate.

Solution to Problem

That is, a flow rate diagnosis apparatus according to an aspect of the present invention includes: a main line in which a diagnosis object, which is a flow rate sensor or a flow rate control apparatus, is provided on an upstream side and a tank having a predetermined volume is provided on a downstream side; a branch line that branches from the main line on an upstream side of the tank; a first open close valve that is provided in the branch line; a second open close valve that is provided between a branch point of the branch line and the tank in the main line; a dead volume that is a volume defined from the diagnosis object as an upstream end and the first open close valve and the second open close valve as downstream ends in the main line and the branch line; a first pressure control mechanism that controls a fluid flowing through the branch line such that a pressure of the fluid in the dead volume is maintained at a first setting pressure during a preparation mode during which the fluid does not flow into the tank by opening of the first open close valve and closing of the second open close valve; a second pressure control mechanism that controls the fluid flowing through the main line such that the pressure of the fluid in the dead volume is maintained at a second setting pressure during an inflow mode during which the fluid is caused to flow into the tank by closing of the first open close valve and opening of the second open close valve after the preparation mode; and a reference flow rate calculating unit that calculates a reference flow rate, which is a flow rate of the fluid that flows into the tank, on a basis of a pressure change generated by the fluid that flows into the tank from a start of the inflow mode until an end of the inflow mode caused by closing of the second open close valve.

A flow rate diagnosis method according to another aspect of the present invention is a flow rate diagnosis method using a flow rate diagnosis apparatus including: a main line in which a diagnosis object, which is a flow rate sensor or a flow rate control apparatus, is provided on an upstream side and a tank having a predetermined volume is provided on a downstream side; a branch line that branches from the main line on an upstream side of the tank; a first open close valve that is provided in the branch line; a second open close valve that is provided between a branch point of the branch line and the tank in the main line; and a dead volume that is a volume defined from the diagnosis object as an upstream end and the first open close valve and the second open close valve as downstream ends in the main line and the branch line. The flow rate diagnosis method includes: controlling a fluid flowing through the branch line such that a pressure of the fluid in the dead volume is maintained at a first setting pressure during a preparation mode during which the fluid does not flow into the tank by opening of the first open close valve and closing of the second open close valve; controlling the fluid flowing through the main line such that the pressure of the fluid in the dead volume is maintained at a second setting pressure during an inflow mode during which the fluid is caused to flow into the tank by closing of the first open close valve and opening of the second open close valve after the preparation mode; and calculating a reference flow rate, which is a flow rate of the fluid that flows into the tank, on a basis of a pressure change generated by the fluid that flows into the tank from a start of the inflow mode until an end of the inflow mode caused by closing of the second open close valve.

If the PVTt method is performed by employing such a configuration, since the second pressure control mechanism operates to maintain the pressure in the dead volume at the second setting pressure from the start of the inflow mode, the decrease amount of the pressure in the dead volume at the start of the inflow mode can be reduced compared with the related art. Thus, the time for the pressure in the dead volume to return to the initial pressure at the start of the inflow mode can be much shortened compared with the related art. This can shorten the time for flow rate diagnosis by using the PVTt method compared with the related art.

Furthermore, in a short time after performing the inflow mode, since the pressure or temperature in the dead volume can return to the same state as that in the preparation mode, for example, the increase amount of the pressure in the tank can be set to any given value. Thus, the increase amount of the pressure in the tank and the amount of the necessary fluid can be reduced compared with the related art. As a result, downsizing of the tank and diagnosis with a high flow rate are enabled.

In order to calculate the reference flow rate in a state where the pressure and temperature in the tank are stabilized and to make the influence of fluctuation of the pressure or temperature unlikely to appear in the reference flow rate, the reference flow rate calculating unit may calculate the reference flow rate on a basis of an elapsed time $\Delta t$ from the start of the inflow mode until the end of the inflow mode and a differential pressure $\Delta P$ between an initial pressure at the start of the inflow mode and a stabilized pressure that is a pressure after a predetermined time has elapsed after the end of the inflow mode.

As a specific configuration example of the first pressure control mechanism, the first pressure control mechanism may include a first pressure sensor that is provided on a downstream side of the first open close valve in the branch line or that is provided in the dead volume, a first control valve that is provided in the branch line, and a first pressure controller that controls the first control valve on a basis of a deviation between the first setting pressure and a first measured pressure that is measured by the first pressure sensor.

As a specific configuration example of the second pressure control mechanism, the second pressure control mechanism may include a second pressure sensor that is provided on a downstream side of the second open close valve in the main line or that is provided in the dead volume, a second control valve that is provided in the main line, and a second pressure controller that controls the second control valve on a basis of a deviation between the second setting pressure and a second measured pressure that is measured by the second pressure sensor.

In order to enable necessary pressure control while reducing the number of members by sharing the pressure sensor used in the first pressure control mechanism and the second pressure control mechanism, the first pressure sensor and the second pressure sensor may be an identical pressure sensor that is provided in the dead volume.

In order to reproduce, at the end of the inflow mode, the pressure and temperature in the dead volume that have been obtained during the preparation mode, the second setting pressure may be an initial pressure that is measured by the second pressure sensor at the start of the inflow mode.

In order to correct the influence of adiabatic compression of the fluid that flows into the tank and to obtain the reference flow rate that is more accurate, the reference flow rate calculating unit may calculate a pre-correction flow rate on a basis of the elapsed time Δt, the differential pressure ΔP, and a gas state equation, and may correct the pre-correction flow rate on a basis of a maximum pressure during the inflow mode or a pressure around the maximum pressure and the stabilized pressure to calculate the reference flow rate.

For example, in a case in which the flow rate to be inspected in an inspection object is high, if the second pressure control mechanism continuously maintains the pressure in the dead volume at the second setting pressure, since the flow rate of the fluid that flows through the main line is high, the speed for charging the tank with the pressure may be too high. As a result, while the pressure in the dead volume fluctuates, the pressure in the tank may reach a predetermined pressure and the inflow mode may end.

In such a case, because the assumption that the pressure in the dead volume is stable in the inflow mode is broken, the gas that should have been contained in the tank remains in the dead volume, or the gas that should be in the dead volume flows into the tank. In other words, when the pressure in the dead volume fluctuates, the amount of gas encapsulated in the tank fluctuates, it is difficult to measure the accurate flow rate. Furthermore, the variation of the elapsed time Δt becomes larger. These factors may reduce the accuracy of the reference flow rate calculated by the reference flow rate calculation section.

In order to address the above issue, the second pressure control mechanism may be configured not to perform pressure control of the fluid in the dead volume during the inflow mode if the flow rate of the fluid that flows through the main line is greater than or equal to a predetermined value. With such a configuration, if the flow rate of the fluid that flows through the main line is greater than or equal to the predetermined value, the same state as that of the PVTt method of the related art can be made. As a result, from the start of the inflow mode to the end of the inflow mode, the responsiveness of the second pressure control mechanism can have no effect on the pressure in the dead volume, and only the responsiveness of the first pressure control mechanism can have an effect on the pressure in the dead volume. Therefore, even if the duration of the inflow mode is short, the operation of each device can have a margin, and the pressure in the dead volume can be stabilized easily. Furthermore, variations of the elapsed time Δt can be made relatively small, even if the flow rate is greater than or equal to the predetermined value, the reference flow rate can be calculated accurately. In addition, if the flow rate of the fluid that flows through the main line is high, the time for charging the tank to the predetermined pressure is not so long, and thus, the reference flow rate can also be obtained within the time that is substantially equal to that in a case in which the flow rate is low, for example.

Even in a case in which the flow rate to be inspected in an inspection object is high, in the flow rate diagnosis apparatus that can calculate the reference flow rate at high accuracy, the inflow mode may be set so as to end when the pressure in the tank reaches the predetermined pressure, and the second pressure control mechanism may be configured not to perform pressure control of the fluid in the dead volume during the inflow mode if the elapsed time from the start of the inflow mode until the end of the inflow mode is shorter than a predetermined time.

If the predetermined time is set on a basis of a stabilization time from the start of the inflow mode until stabilization of a pressure in the dead volume at the second setting pressure by the pressure control performed by the second pressure control mechanism, the reference flow rate can be calculated at high accuracy while the reference flow rate can be calculated at a higher speed than in the related art in a case in which the flow rate of the fluid that flows through the main line is low, and the reference flow rate can be calculated at high accuracy while the time for diagnosis is prevented from becoming so long in a case in which the flow rate of the fluid that flows through the main line is high.

In order to obtain substantially the same effects as those of the flow rate diagnosis apparatus according to an aspect of the present invention by updating a program in an existing flow rate diagnosis apparatus, for example, a program for a flow rate diagnosis apparatus may be used, the flow rate diagnosis apparatus including: a main line in which a diagnosis object, which is a flow rate sensor or a flow rate control apparatus, is provided on an upstream side and a tank having a predetermined volume is provided on a downstream side; a branch line that branches from the main line on an upstream side of the tank; a first open close valve that is provided in the branch line; a second open close valve that is provided between a branch point of the branch line and the tank in the main line; and a dead volume that is a volume defined from the diagnosis object as an upstream end and the first open close valve and the second open close valve as downstream ends in the main line and the branch line, the program causing a computer to function as: a first pressure controller that controls a fluid flowing through the branch line such that a pressure of the fluid in the dead volume is maintained at a first setting pressure during a preparation mode during which the fluid does not flow into the tank by opening of the first open close valve and closing of the second open close valve; a second pressure controller that controls the fluid flowing through the main line such that the pressure of the fluid in the dead volume is maintained at a second setting pressure during an inflow mode during which the fluid is caused to flow into the tank by closing of the first open close valve and opening of the second open close valve after the preparation mode; and a reference flow rate calculating unit that calculates a reference flow rate, which is a flow rate of the fluid that flows into the tank, on a basis of a pressure change generated by the fluid that flows into the tank from a start of the inflow mode until an end of the inflow mode caused by closing of the second open close valve.

Note that the program for a flow rate diagnosis apparatus may be electronically distributed or may be stored on a program storage medium, such as a compact disc (CD), a digital versatile disc (DVD), or a flash memory.

A flow rate diagnosis apparatus according to another aspect of the present invention includes: a main line in which a diagnosis object, which is a flow rate sensor or a flow rate control apparatus, is provided on an upstream side and a tank having a predetermined volume is provided on a downstream side; a branch line that branches from the main line on an upstream side of the tank; a first open close valve that is provided in the branch line; a second open close valve that is provided between a branch point of the branch line and the tank in the main line; a dead volume that is a volume defined from the diagnosis object as an upstream end and the first open close valve and the second open close valve as downstream ends in the main line and the branch line; a first pressure control mechanism that controls a fluid flowing through the branch line such that a pressure of the fluid in the dead volume is maintained at a first setting pressure during a preparation mode during which the fluid does not flow into the tank by opening of the first open close valve and closing of the second open close valve; and a reference flow rate calculating unit that calculates a reference flow rate, which is a flow rate of the fluid that flows into the tank, on a basis of a pressure change generated by the fluid that flows into the tank from a start of an inflow mode, the inflow mode being a mode during which the fluid is caused to flow into the tank by closing of the first open close valve and opening of the second open close valve after the preparation mode, until an end of the inflow mode caused by closing of the second open close valve and an elapsed time from the start of the inflow mode until the end of the inflow mode, in which the reference flow rate calculating unit is configured to calculate the elapsed time on a basis of a measured value of a physical quantity of the fluid in the dead volume or a value indicating an actual operation of the first open close valve or the second open close valve.

With such a configuration, it is possible to correctly determine, as the start of the inflow mode, the time point at which the pressure of the fluid in the dead volume actually starts to change by switching of the first open close valve and the second open close valve. Thus, as a result of setting the differential pressure ΔP, which is a pressure increase amount during the inflow mode, to a small amount, even if the elapsed time Δt is short, high measurement accuracy of the elapsed time Δt can be maintained, and the reference flow rate can be calculated at high accuracy.

If the reference flow rate calculating unit is configured to calculate the elapsed time on a basis of a measured value of the pressure of the fluid in the dead volume, output of an existing pressure sensor can be used as a trigger for determining the elapsed time Δt, and a new sensor or the like is not necessarily added.

As a specific configuration for detecting the start of the inflow mode, the reference flow rate calculating unit may be configured to determine that the start of the inflow mode is a time point at which the pressure in the dead volume changes by a predetermined value or more after switching of open/close of the first open close valve and the second open close valve.

Advantageous Effects of Invention

As described above, the flow rate diagnosis apparatus according to aspects of the present invention includes the second pressure control mechanism that performs control such that the pressure of the fluid in the dead volume is maintained constant during the inflow mode and thus can shorten the time from the start of the inflow mode until the end thereof by preventing a large decrease in the pressure in the dead volume. As a result, the time for flow rate diagnosis can be shortened even when using the PVTt method, and the amount of the fluid necessary for flow rate diagnosis can be reduced.

BRIEF DESCRIPTION OF DRAWINGS

FIGS. 9A and 9B are graphs indicating operations of and temporal changes of a pressure in a flow rate diagnosis apparatus according to a third embodiment of the present invention.

DESCRIPTION OF THE PREFERRED EMBODIMENTS

A flow rate diagnosis apparatus 100 according to a first embodiment of the present invention will be described with reference to FIGS. 1 to 6.

The flow rate diagnosis apparatus 100 according to the first embodiment is, for example, incorporated in a semiconductor manufacturing line or the like and is used for diagnosing a flow rate for a mass flow controller, which is a flow rate control apparatus. Note that the flow rate diagnosis herein is a concept including determination of whether a flow rate that is output from the mass flow controller is correct relative to a reference flow rate that is output from the flow rate diagnosis apparatus 100 or calibration of the flow rate that is output from the mass flow controller on the basis of the reference flow rate that is output from the flow rate diagnosis apparatus 100. In addition, in the first embodiment, various gasses are caused to flow as a fluid.

Figure 1:
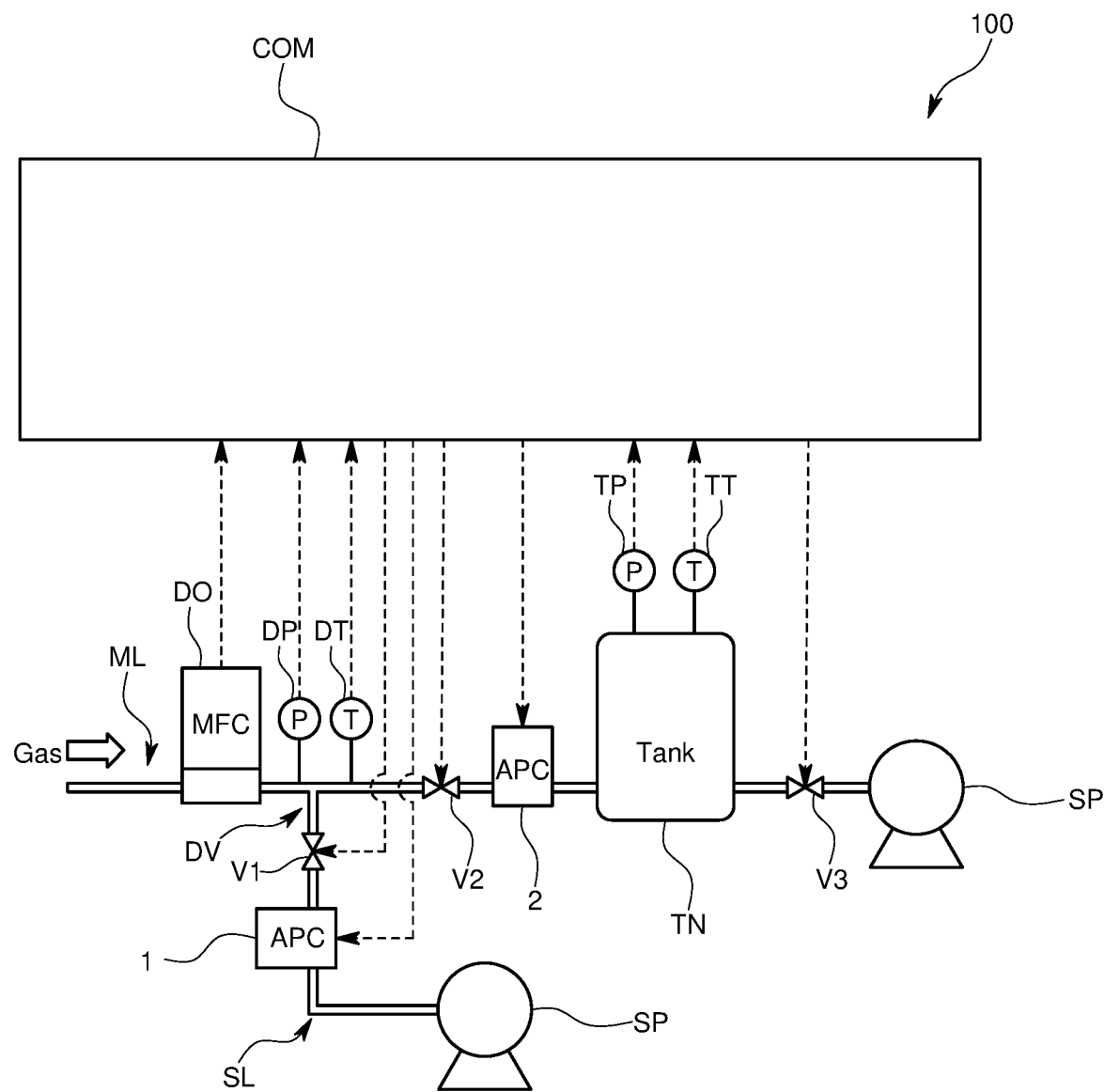
FIG. 1 schematically illustrates a configuration of a flow rate diagnosis apparatus according to a first embodiment of the present invention.

As illustrated in FIG. 1, the flow rate diagnosis apparatus 100 according to the first embodiment includes a main line ML and a branch line SL as flow lines. The main line ML connects a mass flow controller, which is a diagnosis object DO, and a tank TN having a predetermined volume. The branch line SL branches from the main line ML between the diagnosis object DO and the tank TN. The flow rate diagnosis apparatus 100 calculates a reference flow rate by using a so-called PVTt method. That is, the flow rate diagnosis apparatus 100 causes a fluid to flow through the branch line SL for a predetermined time, and, after the pressure or temperature of the fluid passing through the mass flow controller has been stabilized, causes the fluid to flow into the tank TN. Then, on a basis of a pressure change in the tank TN, the flow rate of the fluid that flows into the tank TN is calculated as a reference flow rate. In addition, while the fluid flows into the tank TN, a measured flow rate that is output from the mass flow controller, which is the diagnosis object DO, is compared with the reference flow rate, and thereby, the flow rate in the mass flow controller is diagnosed.

Next, a hardware configuration of the flow rate diagnosis apparatus 100 will be described in detail.

To downstream ends of the main line ML and the branch line SL, pumps SP, which are vacuum sources, are connected. As each of the pumps SP, for example, a pump that draws a vacuum in a vacuum chamber may be used. In addition, in the main line ML and the branch line SL, a plurality of valves for switching flow lines or changing an object to be decompressed are provided. Specifically, a first open close valve V1 is provided in the branch line SL, a second open close valve V2 is provided between a branch point of the branch line SL and the tank TN in the main line ML, and a third valve V3 is provided on the downstream side of the tank TN in the main line ML.

Herein, in the first embodiment, in the main line ML and the branch line SL, the volume from the mass flow controller, which is the diagnosis object DO, as an upstream end and the first open close valve V1 and the second open close valve V2 as downstream ends is defined as a dead volume DV. In the first embodiment, in the dead volume DV, a DV pressure sensor DP for measuring the internal pressure thereof and a DV temperature sensor DT for measuring the internal temperature thereof are provided. In addition, the tank TN is provided with a tank pressure sensor TP and a tank temperature sensor TT for measuring the pressure and temperature of the fluid in the tank TN, which are necessary for calculating the reference flow rate.

Furthermore, a first auto pressure controller (APC), which is a first pressure control mechanism 1, is provided on the downstream side of the first open close valve V1 in the branch line SL, and a second APC, which is a second pressure control mechanism 2, is provided between the second open close valve V2 and the tank TN in the main line ML.

Figure 2:
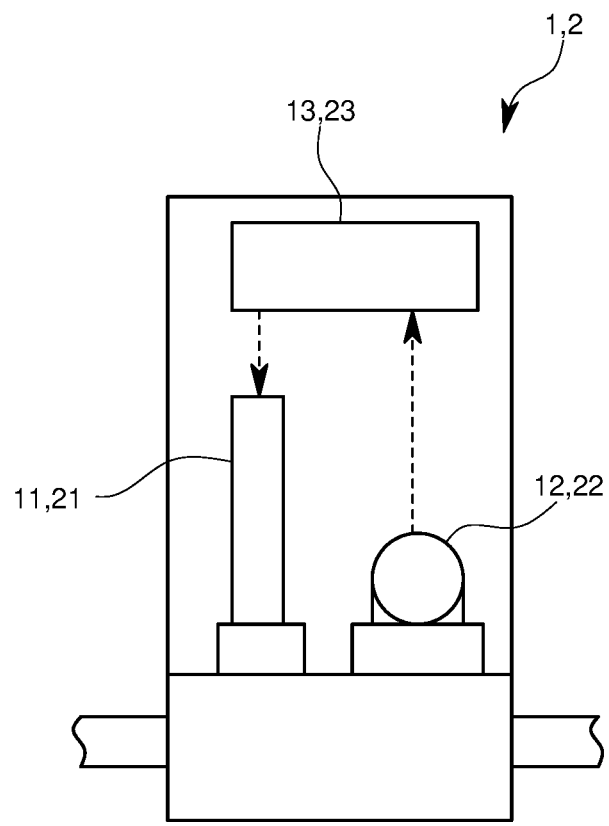
FIG. 2 schematically illustrates details of APCs according to the first embodiment.

The APCs, which are the first pressure control mechanism 1 and the second pressure control mechanism 2, include, as illustrated in FIG. 2, control valves 11 and 21, pressure sensors 12 and 22, and pressure controllers 13 and 23 that perform feedback control of opening degrees of the control valves so as to reduce the deviation between measured pressures that are measured by the pressure sensors 12 and 22 and setting pressures that are set. The control valve 11, the pressure sensor 12, and the pressure controller 13 are packaged in a single housing as the first pressure control mechanism 1, whereas the control valve 21, the pressure sensor 22, and the pressure controller 23 are packaged in a single housing as the second pressure control mechanism 2. Note that, in the following description, when it is necessary to distinguish the control valves 11 and 21, the pressure sensors 12 and 22, the pressure controllers 13 and 23, and the setting pressures of the first APC and the second APC, those belonging to the first APC are prefixed by "first", and those belonging to the second APC are prefixed by "second". The first setting pressure that is set for the first APC and the second setting pressure that is set for the second APC can be set to different values but are set to the same value in the first embodiment. That is, each setting pressure is set to a desired pressure that is desirably maintained in the dead volume DV during the operation for flow rate diagnosis.

Figure 3:
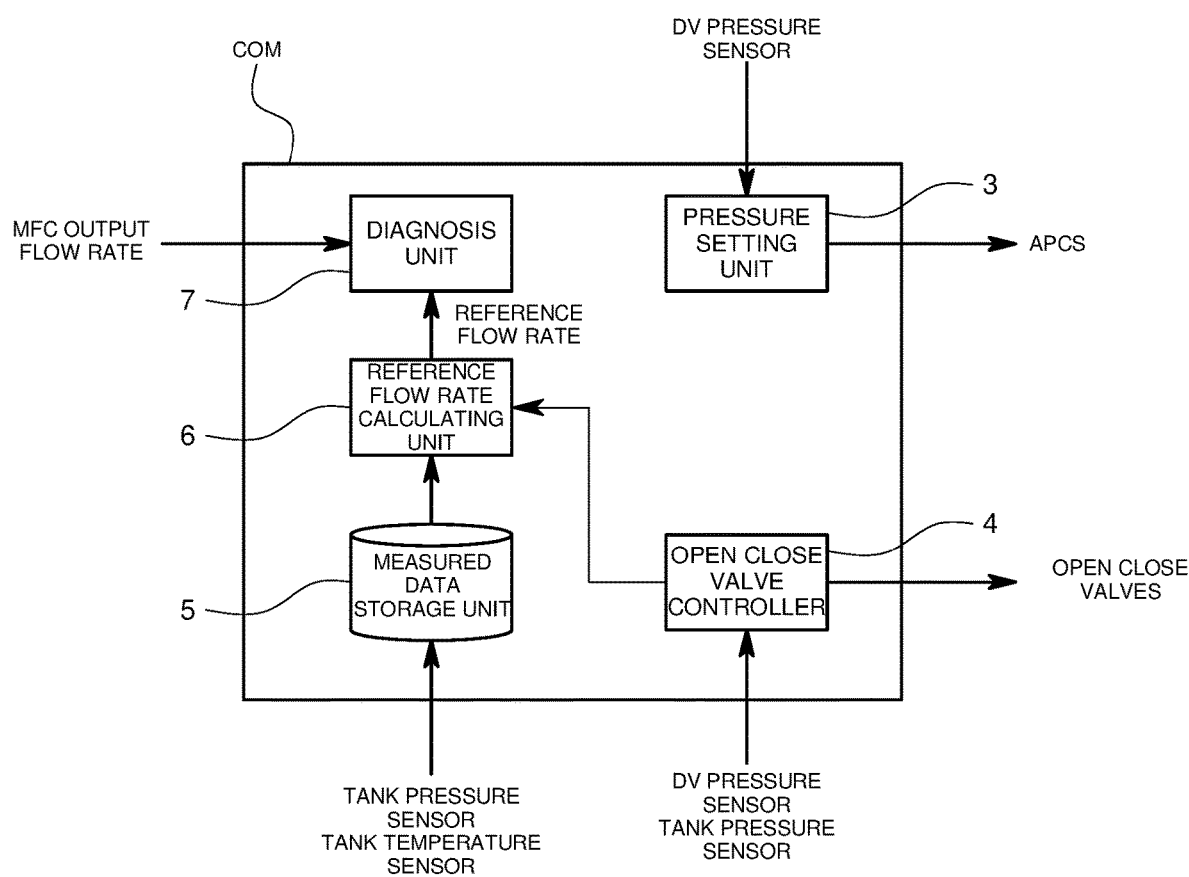
FIG. 3 is a schematic block diagram illustrating a configuration of a control operation mechanism according to the first embodiment.

As illustrated in FIG. 1, the flow rate diagnosis apparatus 100 further includes a control operation mechanism COM that controls devices and performs various operations. The control operation mechanism COM receives user input or a signal that is output from the mass flow controller, the DV pressure sensor DP, the tank pressure sensor TP, or the tank temperature sensor TT and also outputs a signal for controlling each valve and each APC. The functions of the control operation mechanism COM are implemented by, for example, a so-called computer including a central processing unit (CPU), a memory, an analog/digital (A/D) converter, a digital/analog (D/A) converter, various input/output devices, and the like. As illustrated in FIG. 3, the control operation mechanism COM implements at least functions of a pressure setting unit 3, a valve controller 4, a measured data storage unit 5, a reference flow rate calculating unit 6, and a diagnosis unit 7.

Each unit of the control operation mechanism COM will be described in detail.

The pressure setting unit 3 sets the setting pressure for each APC. The initial value of the setting pressure set by the pressure setting unit 3 is a user setting value that is input by a user. The pressure setting unit 3 also changes the setting pressure in accordance with an error between the user setting value and the pressure in the dead volume DV that is measured by the DV pressure sensor DP at a predetermined timing, which will be described later. For example, if there is an error between the user setting value and the pressure in the dead volume DV that is measured at a predetermined timing, the pressure setting unit 3 adds the error or a value obtained by multiplying the error by a predetermined factor to the user setting value and sets the obtained value as the setting pressure for the APC.

The valve controller 4 implements at least any of an exhaust mode, a preparation mode, an inflow mode, and a stop mode by controlling the open/close state of the valves V1, V2, and V3. In the first embodiment, the valve controller 4 switches the modes sequentially by using, as a trigger, a value measured by the DV pressure sensor DP, the DV temperature sensor DT, the tank pressure sensor TP, or the tank temperature sensor TT. In the exhaust mode, vacuum exhausting is performed in the tank TN by closing the second open close valve V2 and opening the third valve V3. In the preparation mode, the inflow mode, and the stop mode, the third valve V3 is maintained in a closed state. If the pressure measured by the tank pressure sensor TP becomes a pressure that is substantially equal to a vacuum in the exhaust mode, the valve controller 4 ends the exhaust mode and starts the next preparation mode.

In the preparation mode, opening of the first open close valve V1 and closing of the second open close valve V2 causes a fluid to flow from the mass flow controller through the branch line SL. The preparation mode is maintained until the pressure and temperature of the fluid passing through the mass flow controller are stabilized. In the first embodiment, the fluid state is determined on a basis of the pressure measured by the DV pressure sensor DP and the temperature measured by the DV temperature sensor DT. Specifically, if operation of the first APC, which is the first pressure control mechanism 1, stabilizes each of the pressure measured by the DV pressure sensor DP and the temperature measured by the DV temperature sensor DT for a predetermined time or longer, and if it can be determined that the pressure and temperature in the dead volume DV are stable, the valve controller 4 ends the preparation mode and starts the next inflow mode.

In the inflow mode, closing of the first open close valve V1 and opening of the second open close valve V2 causes the fluid to flow from the mass flow controller through the main line ML into the tank TN. After the pressure and temperature of the fluid in the dead volume DV have been substantially stabilized at values at the start of the inflow mode, the inflow mode is continued until the pressure in the tank TN increases to a predetermined pressure. Specifically, after operation of the second APC, which is the second pressure control mechanism 2, has maintained the pressure in the dead volume DV at the setting pressure and has stabilized the temperature, when the pressure in the tank TN measured by the tank pressure sensor TP increases to the pressure set by a user, the valve controller 4 ends the inflow mode and starts the next stop mode.

In the stop mode, the first open close valve V1 and the second open close valve V2 are closed. This state is continued at least until the pressure and temperature in the tank TN are stabilized.

The measured data storage unit 5 stores the values measured by the tank pressure sensor TP and the tank temperature sensor TT during flow rate diagnosis in, for example, the form of time-series data. In this embodiment, the measured data storage unit 5 stores at least the pressure and temperature in the tank TN that are measured during the inflow mode and the stop mode.

On a basis of data stored in the measured data storage unit 5, the reference flow rate calculating unit 6 calculates the flow rate of the fluid that flows into the tank TN during the inflow mode. The reference flow rate is calculated on a basis of a pressure change generated in the tank TN during the inflow mode. More specifically, the reference flow rate is calculated on a basis of an elapsed time Δt from the start of the inflow mode until the end thereof, a differential pressure ΔP between the initial pressure at the start of the inflow mode and a stabilized pressure that is a pressure in the tank TN after becoming stabilized during the stop mode, an average temperature $T_{ave}$ in the tank TN during the inflow mode, and a gas state equation. That is, the reference flow rate is calculated according to the following equation.

$$Qs=(\Delta P/\Delta t)*22.4*V/(RT_{ave})$$

In the equation, Qs is the reference flow rate, V is the volume of the tank TN, and R is a gas constant. In addition, 22.4 to be multiplied as a factor is the mol volume L/mol of an ideal gas. This factor varies by about several percent depending on gaseous species, and thus, a value corrected in accordance with the gaseous species that is actually made to flow may be used.

The diagnosis unit 7 compares the flow rate that is measured in the mass flow controller during the inflow mode with the reference flow rate that is calculated by the reference flow rate calculating unit 6 and diagnoses the flow rate in the mass flow controller.

Figure 4A:
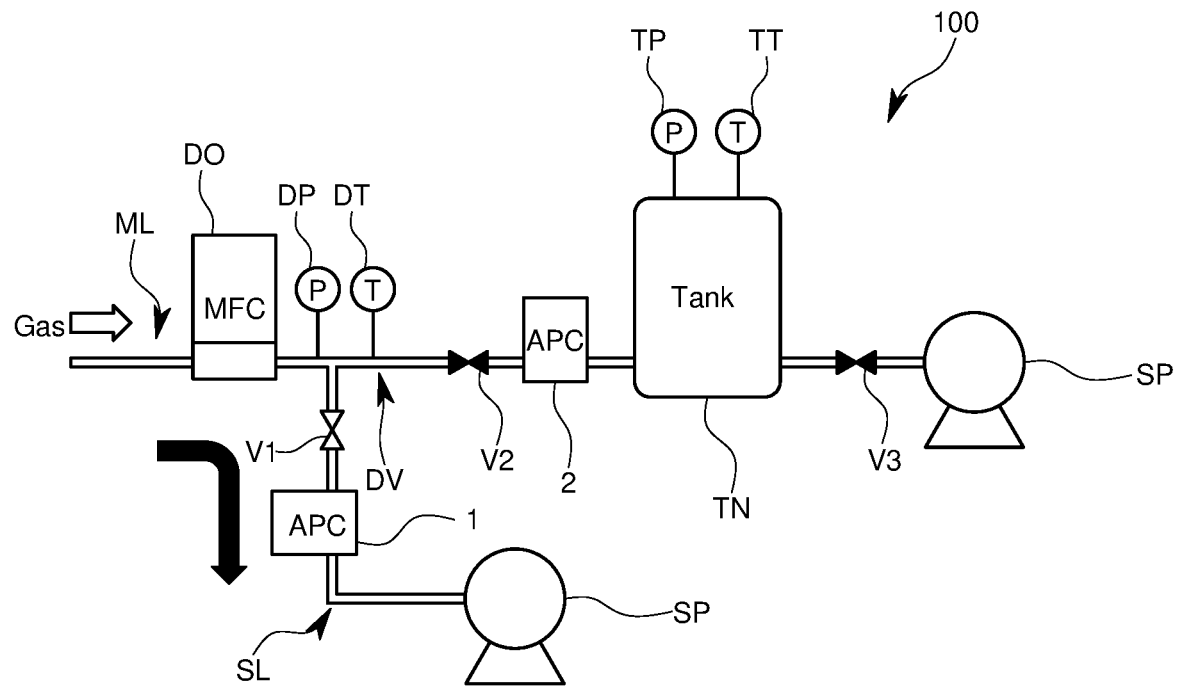
FIGS. 4A and 4B schematically illustrate flow of a fluid during a preparation mode and during an inflow mode according to the first embodiment, respectively.
Figure 4B:
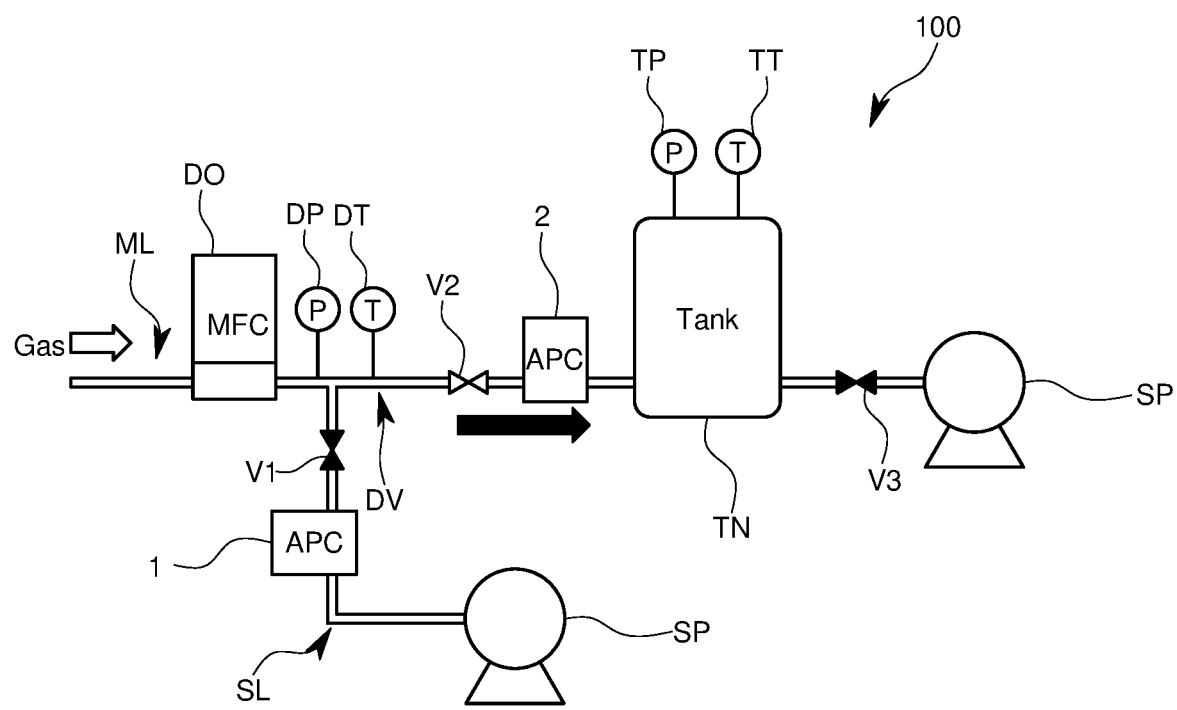
Figure 5:
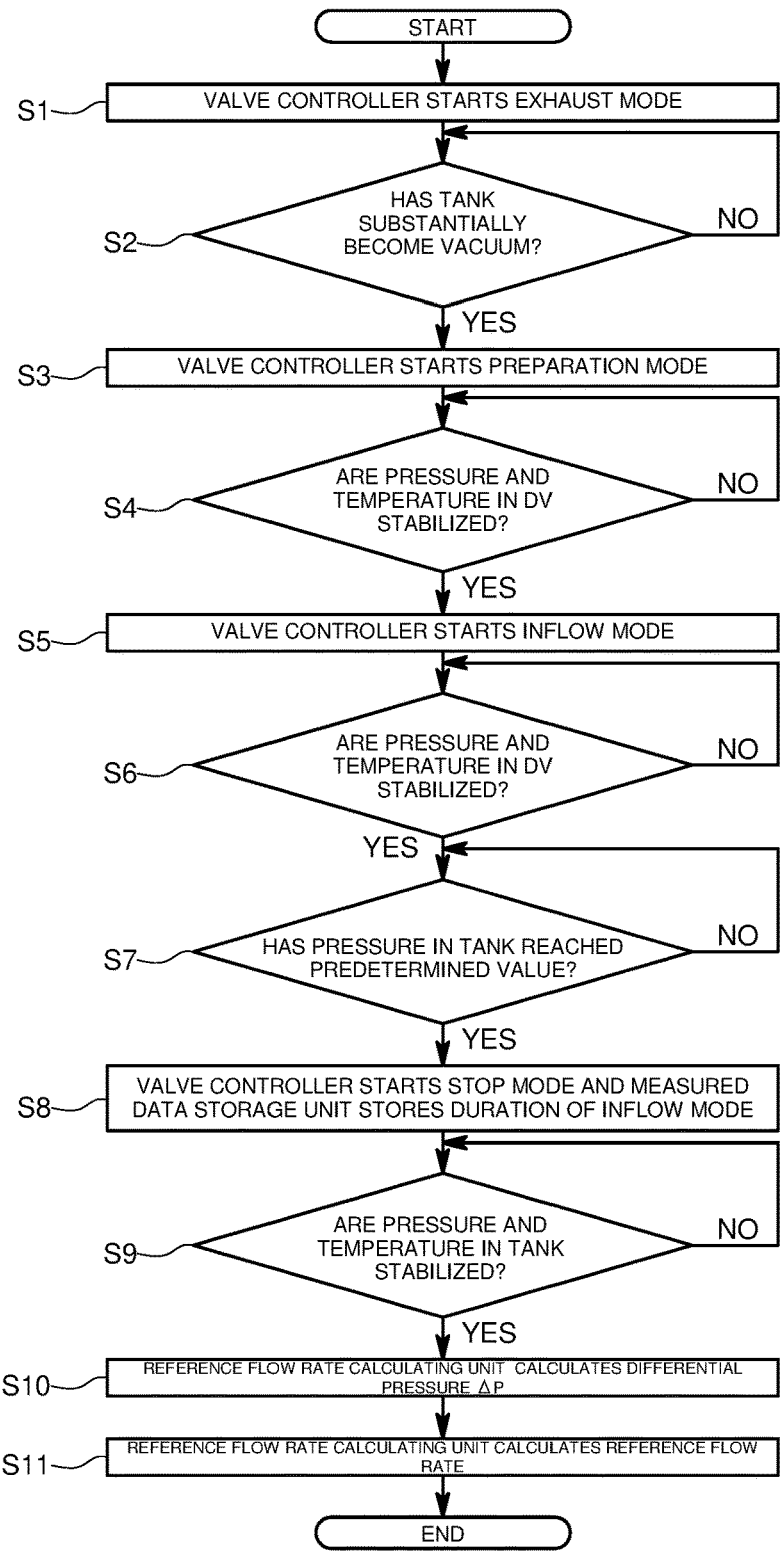
FIG. 5 is a flowchart illustrating a flow rate diagnosis operation according to the first embodiment.

Next, an operation for calculating the reference flow rate performed by the flow rate diagnosis apparatus 100 according to the first embodiment configured in the above manner will be described with reference to the schematic diagrams in FIGS. 4A and 4B and the flowchart in FIG. 5. Note that the measured data storage unit 5 continuously stores the time-series data of the pressure and temperature in the tank TN successively, and thus, the storing step is not illustrated in the flowchart in FIG. 5.

First, the valve controller 4 closes the second open close valve V2 and opens the third valve V3 to start the exhaust mode (step S1). As a result, decompression of the tank TN is started. Subsequently, the valve controller 4 determines whether the pressure measured by the tank pressure sensor TP substantially becomes a vacuum (step S2).

When the pressure in the tank TN substantially becomes a vacuum, the valve controller 4 ends the exhaust mode. Subsequently, the valve controller 4 opens the first open close valve V1 and closes the second open close valve V2 and the third valve V3 to start the preparation mode (step S3). As a result, as illustrated in FIG. 4A, the fluid passing through the mass flow controller flows through the branch line SL and is not introduced into the tank TN. Subsequently, as illustrated in FIG. 5, the valve controller 4 determines whether the pressure measured by the DV pressure sensor DP is maintained around the setting pressure that is set for the first APC for a predetermined time or longer (step S4). That is, in step S4, on a basis of the output of the DV pressure sensor DP, it is determined whether the pressure and temperature in the dead volume DV are stabilized.

If it is determined that the pressure and temperature in the dead volume DV are stabilized, the valve controller 4 ends the preparation mode. Subsequently, the valve controller 4 closes the first open close valve V1 and opens the second open close valve V2 to start the inflow mode (step S5). As a result, as illustrated in FIG. 4B, inflow of the fluid into the tank TN is started. Subsequently, as illustrated in FIG. 5, the valve controller 4 determines whether the pressure measured by the DV pressure sensor DP is stabilized around the pressure at the start of the inflow mode (step S6), and the valve controller 4 further determines whether the pressure measured by the tank pressure sensor TP reaches a target pressure that is set in advance by a user (step S7). Herein, when operation of the second APC switches the preparation mode to the inflow mode, although the pressure decreases to some degree, the pressure returns to a value around the pressure at the start of the inflow mode in a short time. Thus, the inflow mode is substantially continued in accordance with the determination standard in step S7.

When the pressure in the tank TN reaches the target pressure, the valve controller 4 ends the inflow mode. Subsequently, the valve controller 4 closes the second open close valve V2 to start the stop mode. In addition, the reference flow rate calculating unit 6 acquires the elapsed time Δt, which is the duration of the inflow mode, confirmed when the inflow mode ends (step S8). The reference flow rate calculating unit 6 also determines whether a state in which the fluctuation in the pressure measured by the tank pressure sensor TP is within a predetermined range is continued for a predetermined time or longer. That is, the reference flow rate calculating unit 6 determines whether the pressure and temperature in the tank TN are stabilized from the fluctuation in the pressure measured by the tank pressure sensor TP (step S9).

If the pressure and temperature in the tank TN are stabilized, the reference flow rate calculating unit 6 acquires the pressure measured by the tank pressure sensor TP at this time as the stabilized pressure and calculates the differential pressure ΔP from the initial pressure at the start of the inflow mode (step S10). Furthermore, on a basis of the elapsed time Δt obtained in step S8 and the differential pressure ΔP obtained in step S10, the reference flow rate calculating unit 6 calculates the reference flow rate (step S11).

In the flow rate diagnosis apparatus 100 according to the first embodiment configured in the above manner, the second APC, which is the second pressure control mechanism 2, is provided in the main line ML. Thus, as illustrated in the graphs in FIG. 6, even when the preparation mode is switched to the inflow mode, unlike in the related art, a sudden decrease in the pressure in the dead volume DV can be prevented, and the pressure in the dead volume DV can be maintained substantially constant at the pressure stabilized during the preparation mode. Thus, in the procedure of the PVTt method of the related art, it is necessary to increase the pressure in the tank TN by allowing time for the pressure and temperature in the dead volume DV to be sufficiently stabilized, whereas, with the PVTt method employed by the flow rate diagnosis apparatus 100 according to the first embodiment, it is substantially unnecessary to wait for the pressure and temperature in the dead volume DV to stabilize. Thus, when the pressure reaches any given target pressure that is set by a user, the inflow mode can be stopped. For example, as illustrated in the graph in FIG. 6, it is possible to set the target pressure to a small value and to end the inflow mode at a lower pressure than in the related art. Thus, the duration of the inflow mode can be made much shortened compared with the related art. As a result, the time necessary for the full flow rate diagnosis procedure can also be shortened.

In addition, the pressure in the tank TN is not necessarily increased to be relatively high, and thus, the amount of the fluid necessary for flow rate diagnosis can be much reduced compared with the related art. In addition, since the pressure and temperature in the dead volume DV can be stabilized in a short time, the flow rate of the fluid that flows into the tank TN during the inflow mode can be increased, and flow rate diagnosis with a high flow rate can be performed.

Figure 7:
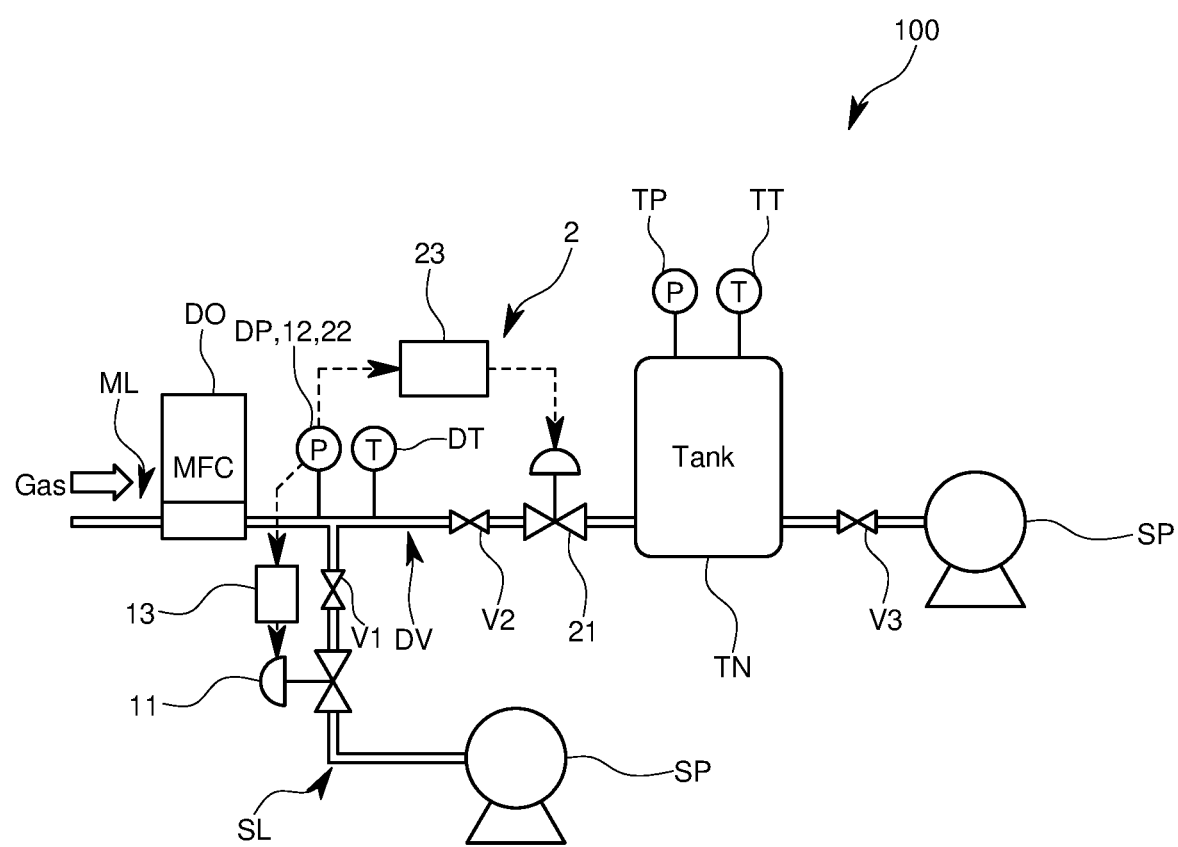
FIG. 7 schematically illustrates a flow rate diagnosis apparatus according to a second embodiment of the present invention.

Next, the flow rate diagnosis apparatus 100 according to a second embodiment will be described with reference to FIG. 7. Note that members corresponding to the members described in the first embodiment are denoted by the same reference numerals.

In the flow rate diagnosis apparatus 100 according to the second embodiment, configurations of the first pressure control mechanism 1 and the second pressure control mechanism 2 differ from those in the first embodiment. That is, the pressure control mechanisms are not packaged like APCs, and the devices are provided separately.

Specifically, the first pressure control mechanism 1 includes the DV pressure sensor DP that corresponds to the first pressure sensor 12 and that is provided in the dead volume DV, the first control valve 11 provided in the branch line SL, and the first pressure controller 13 that performs feedback control of the opening degree of the first control valve 11 on a basis of the deviation between the pressure measured by the DV pressure sensor DP and the first setting pressure.

In addition, the second pressure control mechanism 2 includes the DV pressure sensor DP that corresponds to the second pressure sensor 22 and that is shared with the first pressure control mechanism 1, the second control valve 21 provided in the main line ML between the second open close valve V2 and the tank TN, and the second pressure controller 23 that performs feedback control of the opening degree of the second control valve 21 on a basis of the deviation between the pressure measured by the DV pressure sensor DP and the second setting pressure.

In the flow rate diagnosis apparatus 100 according to the second embodiment, also, even when the preparation mode for causing the fluid to flow through the branch line SL is switched to the inflow mode for causing the fluid to flow into the tank TN, the second pressure control mechanism 2 can prevent a large decrease in the pressure in the dead volume DV. This can shorten the time until the pressure and temperature in the dead volume DV are stabilized, which is a condition for ending the inflow mode. As a result, the amount of the fluid necessary for flow rate diagnosis can be reduced, and the time for the full flow rate diagnosis procedure can be shortened.

Next, the flow rate diagnosis apparatus 100 according to a third embodiment will be described with reference to FIG. 8 and FIGS. 9A and 9B. Note that members corresponding to the members described in the first embodiment are denoted by the same reference numerals.

The flow rate diagnosis apparatus 100 according to the third embodiment has substantially the same configuration as the flow rate diagnosis apparatus according to the first embodiment illustrated in FIG. 1, but differs from the flow rate diagnosis apparatus 100 according to the first embodiment in that the operation changes in accordance with the flow rate diagnosed in the diagnosis object. Specifically, the second pressure control mechanism 2 is configured not to perform pressure control of the fluid in the dead volume DV during the inflow mode if the flow rate to be calibrated is greater than or equal to a predetermined value, that is, if the flow rate of the fluid that flows through the main line ML is greater than or equal to the predetermined value. Note that, if the flow rate of the fluid that flows through the main line ML is less than the predetermined value, as in the first embodiment, the second pressure control mechanism 2 performs pressure control in the dead volume DV during the inflow mode.

Figure 8:
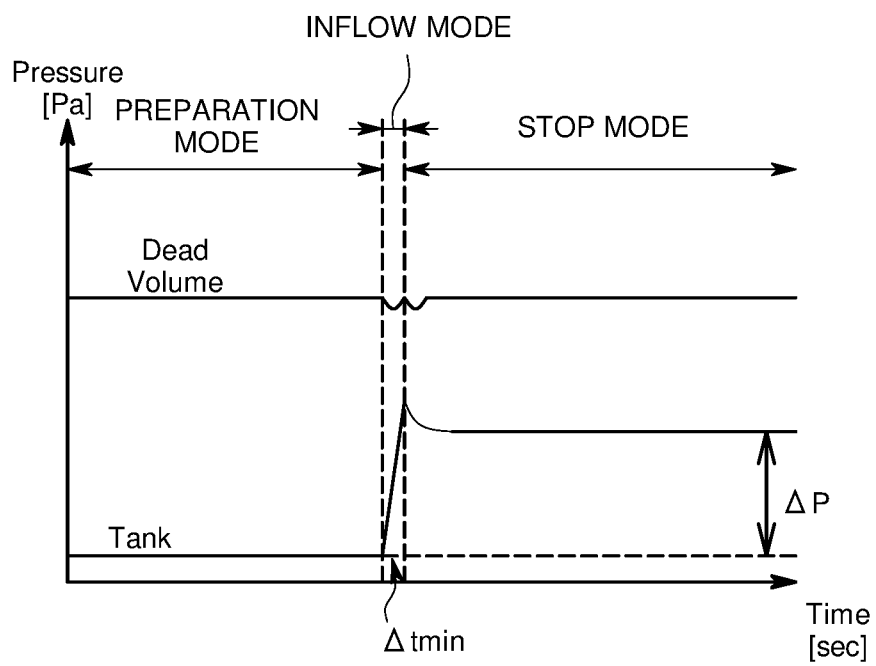
FIG. 8 is a graph indicating a temporal change of a pressure in a flow rate diagnosis apparatus in a case in which a flow rate value to be diagnosed is set to a large value and a second pressure control mechanism controls a pressure in a dead volume.

In a case in which the flow rate value to be calibrated is greater than or equal to the predetermined value, if the second pressure control mechanism 2 maintains the pressure in the dead volume DV during the inflow mode at the second setting pressure, as illustrated in FIG. 8, the pressure in the dead volume DV may remain in an unstable state. This is due to the fact that the responsiveness of the second pressure control mechanism 2 cannot stabilize the pressure in the dead volume DV and keep it at a constant value when both the first pressure control mechanism 1 and the second pressure control mechanism 2 are subjected to pressure control and open/close control in a short period of time.

Accordingly, the flow rate diagnosis apparatus 100 according to the third embodiment can maintain substantially consistent accuracy of the calculated reference flow rate regardless of the value of the flow rate to be calibrated. Specifically, if the flow rate to be calibrated in the diagnosis object is less than the predetermined value, as illustrated in FIG. 9A, during the inflow mode, the second APC, which is the second pressure control mechanism 2, performs pressure control such that the pressure in the dead volume DV is maintained at the second setting pressure. That is, substantially the same control operation as that in the first embodiment controls the opening degree of the control valve 21 in the second APC. On the other hand, if the flow rate to be calibrated in the diagnosis object is greater than or equal to the predetermined value, as illustrated in FIG. 9B, during the inflow mode, the second APC, which is the second pressure control mechanism 2, does not perform pressure control, and the pressure naturally increases in response to the fluid flowing into the tank TN. That is, the second APC maintains the control valve 21 in a full-open state so as not to cause flow line resistance.

Such control performed by the second APC, which is the second pressure control mechanism 2, is switched by, for example, the pressure setting unit 3 that sets the second setting pressure for the second APC. Specifically, the pressure setting unit 3 receives information about the flow rate of the fluid that flows through the main line ML, which is to be calibrated, and, through comparison of the flow rate with a preset threshold value, determines whether to set the second setting pressure for causing the second APC to perform pressure control or to set a full-open instruction for maintaining the control valve 21 in a full-open state.

In the flow rate diagnosis apparatus 100 according to the third embodiment configured in the above manner, if the flow rate diagnosed in the diagnosis object is greater than or equal to the predetermined value, the reference flow rate is calculated by the same PVTt method as that in the related art; if the flow rate diagnosed in the diagnosis object is less than the predetermined value, the reference flow rate can be calculated by the improved PVTt method as in the flow rate diagnosis apparatus 100 according to the first embodiment. As a result, when the flow rate flowing through the main line ML is large and the elapsed time $\Delta t$, which is the length of the period during which the inflow mode is implemented, is short, the control operation of the second pressure control mechanism 2 is not performed. This prevents the pressure in the dead volume DV from becoming unstable by the responsiveness of the second pressure control mechanism 2. Therefore, even when calibrating a large flow rate, the reproducibility of the flow rate of the gas flowing from the dead volume DV to the tank TN can also be improved and the reference flow rate can be calculated accurately.

If the flow rate is high, the time necessary to calculate the reference flow rate can be made substantially equal to that in a case where, for example, the flow rate of the fluid that flows through the main line is low, as the time for the pressure in the tank TN to increase is short even when using the same PVTt method as that in the related art.

Note that the flow rate value serving as the threshold value for determining whether the second pressure control mechanism 2 performs pressure control during the inflow mode in the third embodiment may be set on the basis of the duration of the elapsed time $\Delta t$ implemented if the second pressure control mechanism 2 performs pressure control or may be set by other methods. For example, the threshold value of flow rate may be set such that the elapsed time $\Delta t$ is longer than a period during which, if the second pressure control mechanism 2 controls the pressure in the dead volume DV, the pressure is not stabilized, that is, not within the allowable range for the second setting pressure, owing to an overshoot or undershoot relative to the second setting pressure.

Next, the flow rate diagnosis apparatus 100 according to a fourth embodiment will be described with reference to FIGS. 10, 11, and 12. Note that members corresponding to the members described in the first embodiment are denoted by the same reference numerals.

The flow rate diagnosis apparatus 100 according to the fourth embodiment differs from that according to the first embodiment in the configuration for acquiring the elapsed time $\Delta t$ from the start of the inflow mode until the end thereof. Specifically, the control operation mechanism COM in the first embodiment is configured such that the start of the inflow mode is detected on a basis of an instruction for switching the first open close valve V1 and the second open close valve V2 from the valve controller 4. In contrast, in the fourth embodiment, the start time point of the inflow mode is determined on a basis of change in the physical quantity of the fluid in the dead volume DV. That is, as illustrated in the control operation mechanism COM according to the fourth embodiment in FIG. 10, the reference flow rate calculating unit 6 is configured so as to set the start of the elapsed time $\Delta t$ on a basis of the pressure measured by the DV pressure sensor DP.

Figure 11:
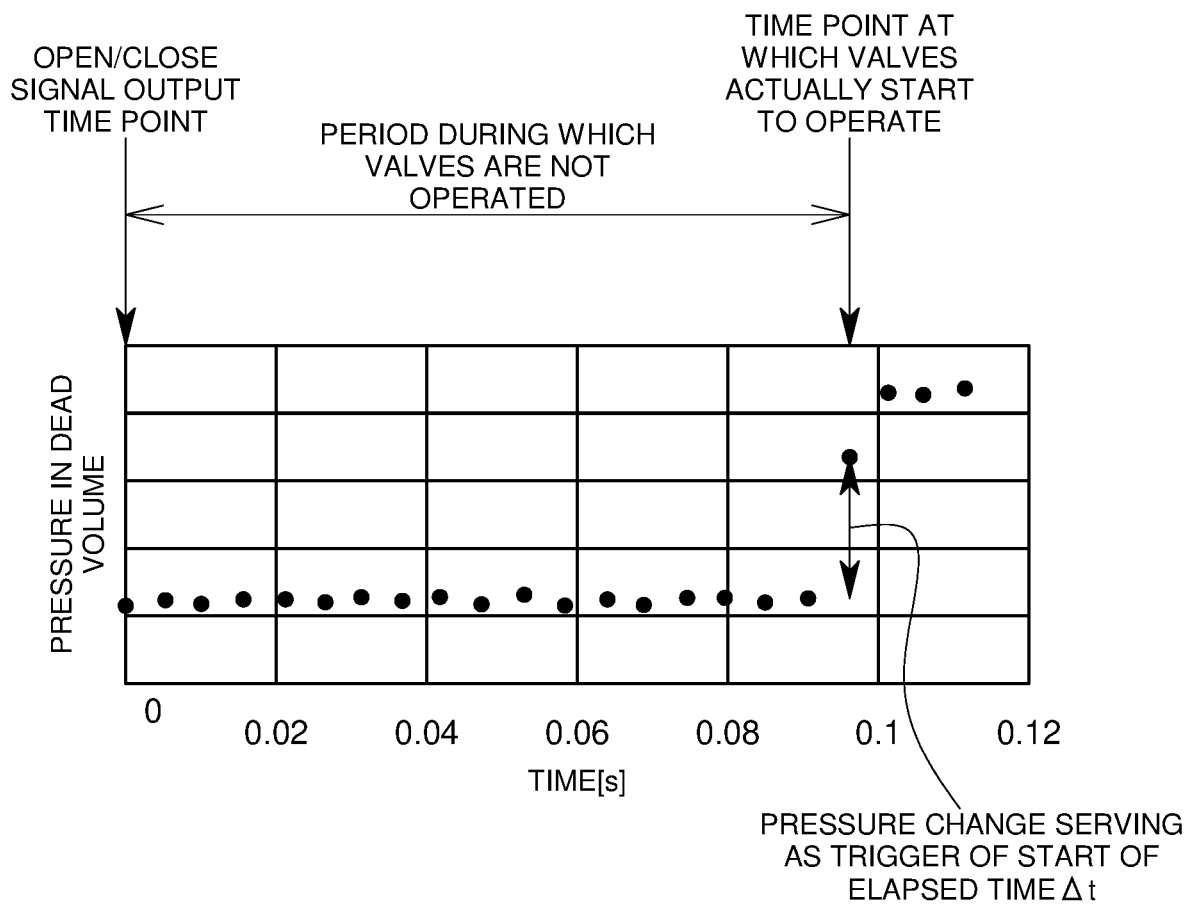
FIG. 11 is a scatter diagram illustrating a method for determining a start time point of an inflow mode according to the fourth embodiment.
Figure 12:
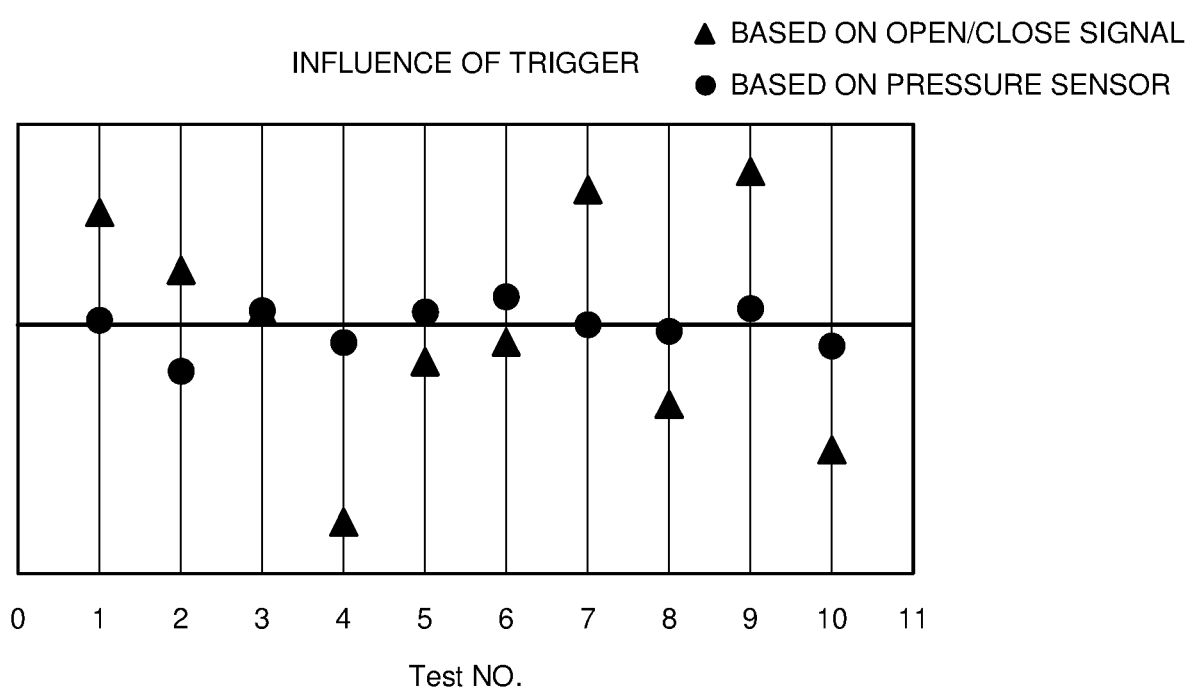
FIG. 12 is a scatter diagram illustrating influences of variations of a reference flow rate calculated by different methods for determining an elapsed time Δt.
Figure 13A:
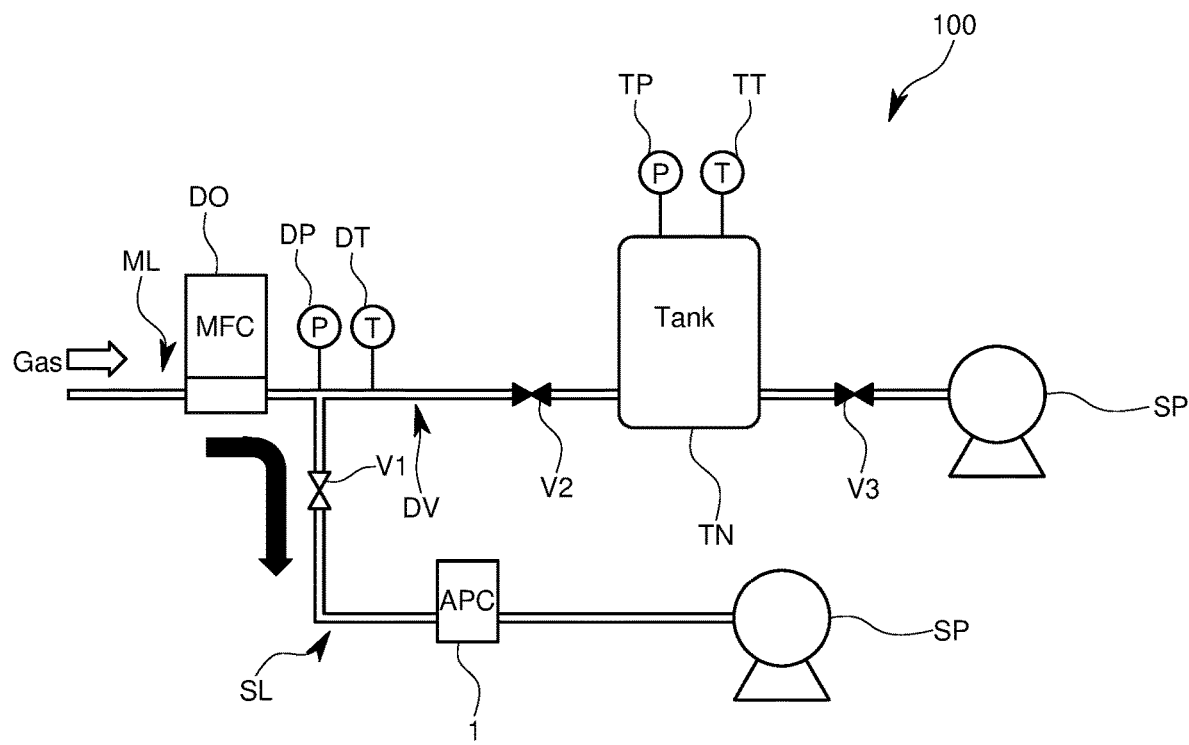
FIGS. 13A and 13B schematically illustrate a configuration of a flow rate diagnosis apparatus of the related art.
Figure 13B:
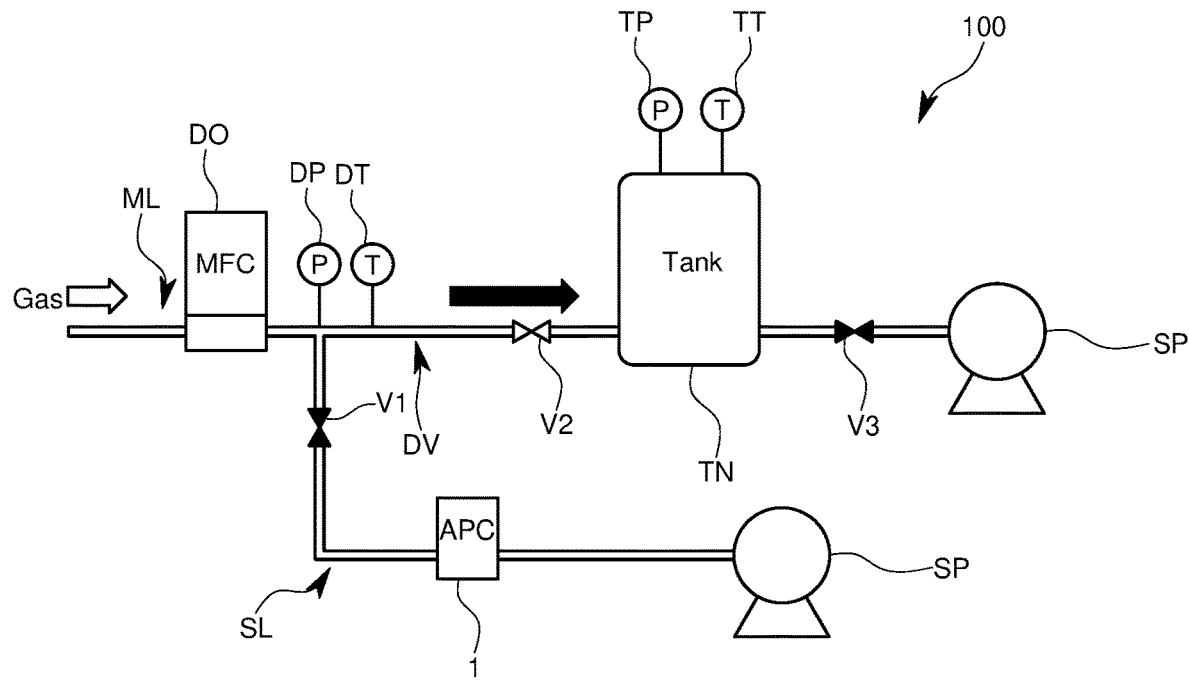
Figure 14:
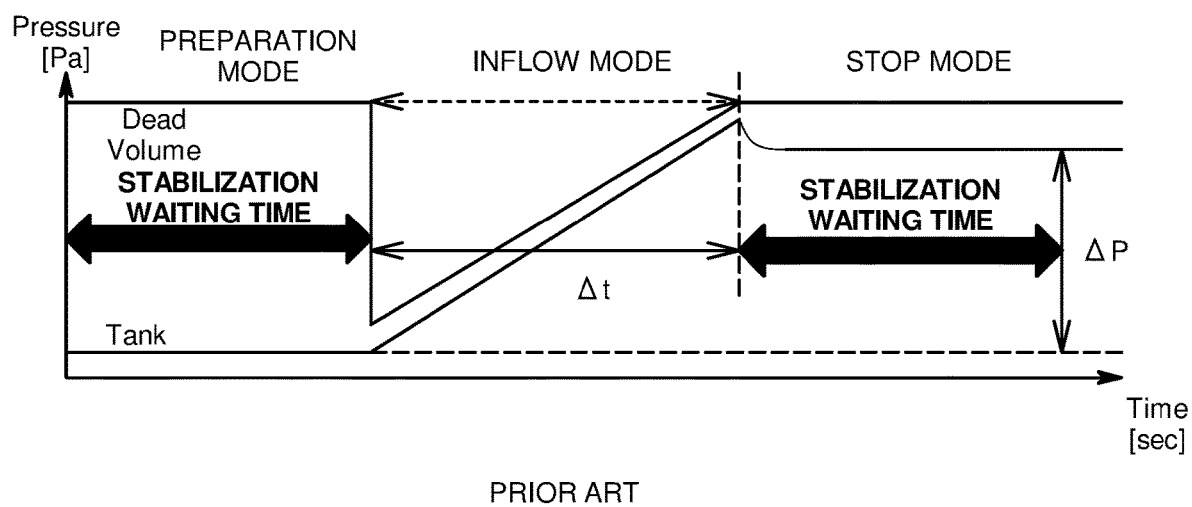
FIG. 14 is a graph indicating a temporal change of a pressure in the flow rate diagnosis apparatus of the related art.

More specifically, as illustrated in FIG. 11, for a certain period from the time point of zero at which an instruction signal for switching open/close of the first open close valve V1 and the second open close valve V2 is output, the pressure in the dead volume DV measured by the DV pressure sensor DP does not substantially change. This is attributed to a little delay in time of actual operations of the first open close valve V1 and the second open close valve V2 in response to output of the open/close instruction signal. Thus, if the start of the inflow mode is determined by using, as a trigger, the open/close instruction signal for the first open close valve V1 and the second open close valve V2, it is determined that the fluid starts to flow into the tank TN at the time at which the first open close valve V1 and the second open close valve V2 are not operated actually. Although the difference in the start time point is an extremely short time, this amount is not negligible as a ratio of an error included in the elapsed time $\Delta t$ if, for example, the differential pressure $\Delta P$, which is a pressure increase amount, is reduced to shorten the time for flow rate diagnosis, or if the flow rate value to be calibrated is large and the elapsed time $\Delta t$ is short.

Figure 10:
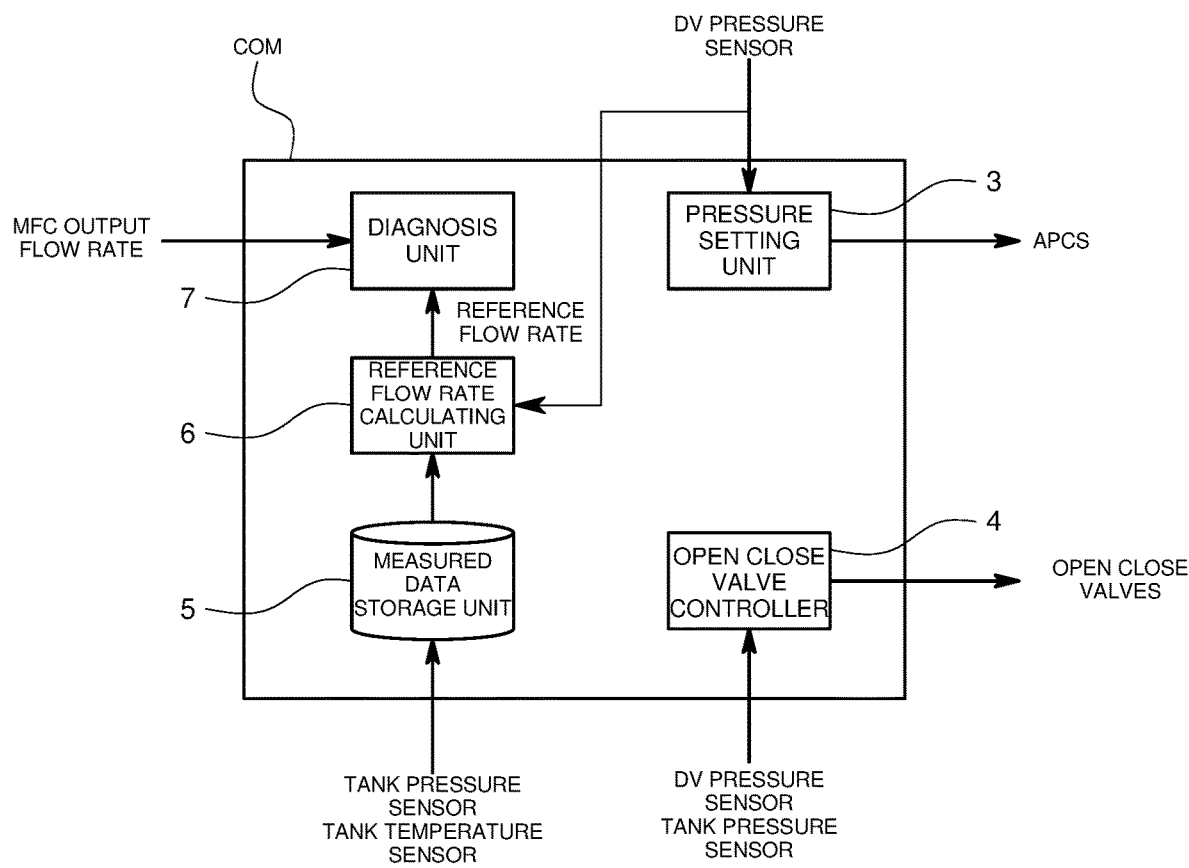
FIG. 10 is a schematic block diagram illustrating a configuration of a control operation mechanism according to a fourth embodiment of the present invention.

In the fourth embodiment, as illustrated in FIG. 10, the reference flow rate calculating unit 6 determines that the start of the elapsed time $\Delta t$ is the time point at which the pressure measured by the DV pressure sensor DP changes by the predetermined amount or more from output of the open/close instruction signal for the first open close valve V1 and the second open close valve V2, that is, by using, as a trigger, a sudden rise of the pressure from a state in which the pressure is stable. The reference flow rate calculating unit 6 also determines the end of the elapsed time $\Delta t$ by using, as a trigger, the pressure in the tank TN reaching the predetermined value, as in the first embodiment.

The flow rate diagnosis apparatus 100 according to the fourth embodiment configured in the above manner determines the elapsed time $\Delta t$ on a basis of the pressure change in the dead volume DV in a first case and determines the elapsed time $\Delta t$ on a basis of the open/close instruction signal for the first open close valve V1 and the second open close valve V2 in a second case. Variations of the reference flow rate calculated in the first case and in the second case are compared for experiment, and the experimental results are illustrated in FIG. 11. As is clear from FIG. 11, by determining the elapsed time $\Delta t$ on a basis of the pressure change, the variations of the reference flow rate calculated in the end can be reduced. Thus, the flow rate diagnosis apparatus 100 according to the fourth embodiment can perform calibration, determination, or the like with higher reliability.

A modification of the fourth embodiment will be described below. The start of the elapsed time $\Delta t$ is not only determined on a basis of the pressure measured by the DV pressure sensor DP but also may be determined on a basis of a physical quantity of the fluid measured by another sensor. That is, the start of the elapsed time $\Delta t$ may be determined by using, as a trigger, a change in the physical quantity, such as temperature, indicating actual operations of the first open close valve V1 and the second open close valve V2. In addition, an opening-degree sensor may be incorporated in the second open close valve V2, and the start of the elapsed time $\Delta t$ may be determined by using, as a trigger, the opening-degree sensor detecting separation of a valve body from a valve seat.

In addition, the way of determining the start of the elapsed time $\Delta t$ described in the fourth embodiment is applicable to the PVTt method of the related art in which the pressure in the dead volume DV is not controlled during the inflow mode and is also applicable to the PVTt method that is improved to control the pressure in the dead volume DV during the inflow mode as in the present invention.

Other embodiments will be described.

The diagnosis object is not limited to the flow rate control apparatus and may be, for example, a flow rate sensor alone.

The branch line may be configured to merge with the main line on the downstream side of the tank. That is, the branch line may be configured as a bypass flow line that bypasses the tank. By employing such a configuration, necessary pumps can be realized as a single pump.

In each embodiment, whether the pressure and temperature of the fluid in the dead volume are stabilized is determined on a basis of only the value measured by the DV pressure sensor. However, a DP temperature sensor may be further provided in the dead volume, and stable outputs of both the DV pressure sensor and the DP temperature sensor may be a condition for determining whether to switch each mode.

Figure 6:
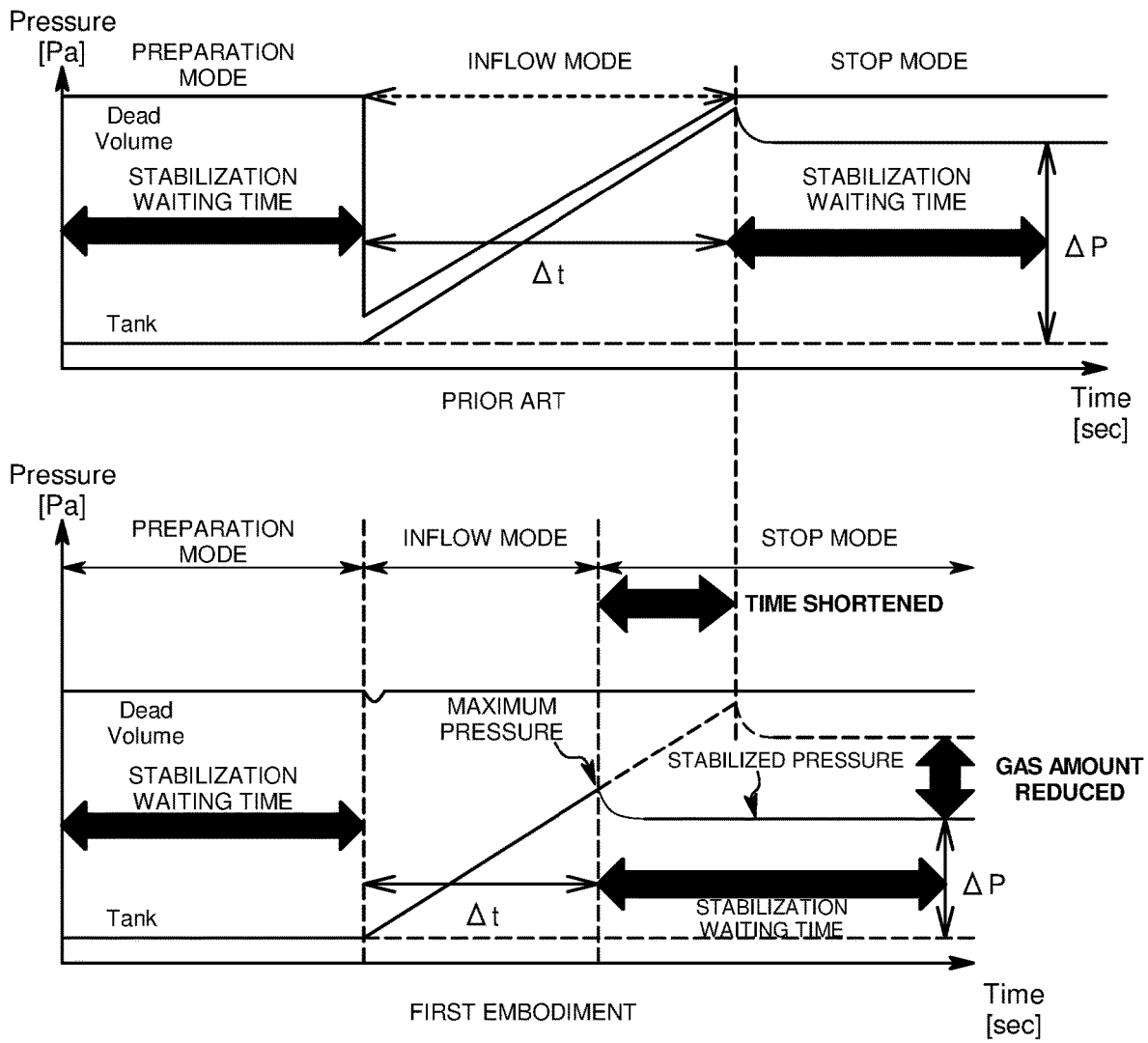
FIG. 6 are graphs indicating a temporal change of a pressure in a flow rate diagnosis apparatus of the related art and a temporal change of a pressure in the flow rate diagnosis apparatus according to the first embodiment.

The method used by the reference flow rate calculating unit to calculate the reference flow rate is not limited to the method described above. For example, the reference flow rate calculating unit may calculate a pre-correction flow rate on a basis of the elapsed time $\Delta t$, the differential pressure $\Delta P$, and the gas state equation and may correct the pre-correction flow rate on a basis of a maximum pressure during the inflow mode or a pressure around the maximum pressure and the stabilized pressure to calculate the reference flow rate. More specifically, the pre-correction flow rate may be multiplied by a value of a ratio between the maximum pressure and the stabilized pressure for correction and may set the reference flow rate. Herein, as illustrated in FIG. 6 for example, the maximum pressure is a pressure measured by the tank pressure sensor when the inflow mode ends, and the stabilized pressure is a pressure measured by the tank pressure sensor after a predetermined time has elapsed from the start of the stop mode. Note that the pressure around the maximum pressure is a concept including a pressure that is measured before or after the above maximum pressure during the inflow mode or the stop mode and that is higher than the stabilized pressure.

In other manners, the embodiments may be modified, or parts of each embodiment may be combined without departing from the spirit of the present invention.

What is claimed is:

1. A flow rate diagnosis apparatus comprising:
   a main line in which a diagnosis object, which is a flow rate sensor or a flow rate control apparatus, is provided on an upstream side and a tank having a predetermined volume is provided on a downstream side;
   a branch line that branches from the main line on an upstream side of the tank;
   a first open close valve that is provided in the branch line;
   a second open close valve that is provided between a branch point of the branch line and the tank in the main line;
   a dead volume that is a volume defined from the diagnosis object as an upstream end and the first open close valve and the second open close valve as downstream ends in the main line and the branch line;
   a first pressure control mechanism that controls a fluid flowing through the branch line such that a pressure of the fluid in the dead volume is maintained at a first setting pressure during a preparation mode during which the fluid does not flow into the tank by opening of the first open close valve and closing of the second open close valve;
   a second pressure control mechanism that is provided between the second open close valve and the tank in the main line, and that controls the fluid flowing through the main line such that the pressure of the fluid in the dead volume is maintained at a second setting pressure during an inflow mode during which the fluid is caused to flow into the tank by closing of the first open close valve and opening of the second open close valve after the preparation mode; and
   a reference flow rate calculating unit that calculates a reference flow rate, which is a flow rate of the fluid that flows into the tank, on a basis of a pressure change generated by the fluid that flows into the tank from a start of the inflow mode until an end of the inflow mode caused by closing of the second open close valve.

2. The flow rate diagnosis apparatus according to claim 1, wherein the reference flow rate calculating unit calculates the reference flow rate, on a basis of an elapsed time $\Delta t$ from the start of the inflow mode until the end of the inflow mode and a differential pressure $\Delta P$ between an initial pressure at the start of the inflow mode and a stabilized pressure that is a pressure after a predetermined time has elapsed after the end of the inflow mode.

3. The flow rate diagnosis apparatus according to claim 1, wherein the first pressure control mechanism includes
   a first pressure sensor that is provided on a downstream side of the first open close valve in the branch line or that is provided in the dead volume,
   a first control valve that is provided in the branch line, and
   a first pressure controller that controls the first control valve on a basis of a deviation between the first setting pressure and a first measured pressure that is measured by the first pressure sensor.

4. The flow rate diagnosis apparatus according to claim 3, wherein the second pressure control mechanism includes
   a second pressure sensor that is provided on a downstream side of the second open close valve in the main line or that is provided in the dead volume,
   a second control valve that is provided in the main line, and
   a second pressure controller that controls the second control valve on a basis of a deviation between the second setting pressure and a second measured pressure that is measured by the second pressure sensor.

5. The flow rate diagnosis apparatus according to claim 4, wherein the first pressure sensor and the second pressure sensor are an identical pressure sensor that is provided in the dead volume.

6. The flow rate diagnosis apparatus according to claim 4, wherein the second setting pressure is an initial pressure that is measured by the second pressure sensor at the start of the inflow mode.

7. The flow rate diagnosis apparatus according to claim 2, wherein the reference flow rate calculating unit calculates a pre-correction flow rate on a basis of the elapsed time $\Delta t$, the differential pressure $\Delta P$, and a gas state equation and corrects the pre-correction flow rate on a basis of a maximum pressure during the inflow mode or a pressure around the maximum pressure and the stabilized pressure to calculate the reference flow rate.

8. The flow rate diagnosis apparatus according to claim 1, wherein the second pressure control mechanism is configured not to perform pressure control of the fluid in the dead volume during the inflow mode if the flow rate of the fluid that flows through the main line is greater than or equal to a predetermined value.

9. The flow rate diagnosis apparatus according to claim 1, wherein the inflow mode is set so as to end when the pressure in the tank reaches a predetermined pressure, and
wherein the second pressure control mechanism is configured not to perform pressure control of the fluid in the dead volume during the inflow mode if an elapsed time from the start of the inflow mode until the end of the inflow mode is shorter than a predetermined time.

10. The flow rate diagnosis apparatus according to claim 9,
wherein the predetermined time is set on a basis of a stabilization time from the start of the inflow mode until stabilization of a pressure in the dead volume at the second setting pressure by the pressure control performed by the second pressure control mechanism.

11. A flow rate diagnosis method using a flow rate diagnosis apparatus including: a main line in which a diagnosis object, which is a flow rate sensor or a flow rate control apparatus, is provided on an upstream side and a tank having a predetermined volume is provided on a downstream side; a branch line that branches from the main line on an upstream side of the tank; a first open close valve that is provided in the branch line; a second open close valve that is provided between a branch point of the branch line and the tank in the main line; and a dead volume that is a volume defined from the diagnosis object as an upstream end and the first open close valve and the second open close valve as downstream ends in the main line and the branch line, the flow rate diagnosis method comprising:
controlling, via a first pressure control mechanism, a fluid flowing through the branch line such that a pressure of the fluid in the dead volume is maintained at a first setting pressure during a preparation mode during which the fluid does not flow into the tank by opening of the first open close valve and closing of the second open close valve;
controlling, via a second pressure control mechanism that is provided between the second open close valve and the tank in the main line, the fluid flowing through the main line such that the pressure of the fluid in the dead volume is maintained at a second setting pressure during an inflow mode during which the fluid is caused to flow into the tank by closing of the first open close valve and opening of the second open close valve after the preparation mode; and
calculating a reference flow rate, which is a flow rate of the fluid that flows into the tank, on a basis of a pressure change generated by the fluid that flows into the tank from a start of the inflow mode until an end of the inflow mode caused by closing of the second open close valve.

12. A non-transitory storage medium storing thereon a program for a flow rate diagnosis apparatus, the flow rate diagnosis apparatus including: a main line in which a diagnosis object, which is a flow rate sensor or a flow rate control apparatus, is provided on an upstream side and a tank having a predetermined volume is provided on a downstream side; a branch line that branches from the main line on an upstream side of the tank; a first open close valve that is provided in the branch line; a second open close valve that is provided between a branch point of the branch line and the tank in the main line; and a dead volume that is a volume defined from the diagnosis object as an upstream end and the first open close valve and the second open close valve as downstream ends in the main line and the branch line, the program causing a computer to function as:
a first pressure controller that controls a fluid flowing through the branch line such that a pressure of the fluid in the dead volume is maintained at a first setting pressure during a preparation mode during which the fluid does not flow into the tank by opening of the first open close valve and closing of the second open close valve;
a second pressure controller that is provided between the second open close valve and the tank in the main line, and that controls the fluid flowing through the main line such that the pressure of the fluid in the dead volume is maintained at a second setting pressure during an inflow mode during which the fluid is caused to flow into the tank by closing of the first open close valve and opening of the second open close valve after the preparation mode; and
a reference flow rate calculating unit that calculates a reference flow rate, which is a flow rate of the fluid that flows into the tank, on a basis of a pressure change generated by the fluid that flows into the tank from a start of the inflow mode until an end of the inflow mode caused by closing of the second open close valve.

13. A flow rate diagnosis apparatus comprising:
a main line in which a diagnosis object, which is a flow rate sensor or a flow rate control apparatus, is provided on an upstream side and a tank having a predetermined volume is provided on a downstream side;
a branch line that branches from the main line on an upstream side of the tank;
a first open close valve that is provided in the branch line;
a second open close valve that is provided between a branch point of the branch line and the tank in the main line;
a dead volume that is a volume defined from the diagnosis object as an upstream end and the first open close valve and the second open close valve as downstream ends in the main line and the branch line;
a first pressure control mechanism that controls a fluid flowing through the branch line such that a pressure of the fluid in the dead volume is maintained at a first setting pressure during a preparation mode during which the fluid does not flow into the tank by opening of the first open close valve and closing of the second open close valve;
a second pressure control mechanism that is provided between the second open close valve and the tank in the main line, and that controls the fluid flowing through the main line such that the pressure of the fluid in the dead volume is maintained at a second setting pressure during an inflow mode during which the fluid is caused to flow into the tank by closing of the first open close valve and opening of the second open close valve after the preparation mode; and
a reference flow rate calculating unit that calculates a reference flow rate, which is a flow rate of the fluid that flows into the tank, on a basis of a pressure change generated by the fluid that flows into the tank from a start of the inflow mode, the inflow mode being a mode during which the fluid is caused to flow into the tank by closing of the first open close valve and opening of the second open close valve after the preparation mode, until an end of the inflow mode caused by closing of the second open close valve and an elapsed time from the start of the inflow mode until the end of the inflow mode, wherein the reference flow rate calculating unit is configured to calculate the elapsed time on a basis of a measured value of a physical quantity of the fluid in the dead volume or a value indicating an actual operation of the first open close valve or the second open close valve.

14. The flow rate diagnosis apparatus according to claim 13,
wherein the reference flow rate calculating unit is configured to calculate the elapsed time on a basis of a measured value of the pressure of the fluid in the dead volume.

15. The flow rate diagnosis apparatus according to claim 13,
wherein the reference flow rate calculating unit is configured to determine that the start of the inflow mode is a time point at which the pressure in the dead volume changes by a predetermined value or more after switching of open/close of the first open close valve and the second open close valve.

* * * * *